(12) United States Patent
Lopez-Estrada

(10) Patent No.: US 7,509,364 B2
(45) Date of Patent: Mar. 24, 2009

(54) PARTIAL OUTPUT FINITE IMPULSE RESPONSE FILTER

(75) Inventor: Alex A. Lopez-Estrada, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 751 days.

(21) Appl. No.: 11/047,791

(22) Filed: Jan. 31, 2005

(65) Prior Publication Data

US 2006/0173945 A1      Aug. 3, 2006

(51) Int. Cl.
*G06F 17/10* (2006.01)
(52) U.S. Cl. ........................................... 708/319
(58) Field of Classification Search ................. 708/319
See application file for complete search history.

(56) References Cited

U.S. PATENT DOCUMENTS

| | | | | |
|---|---|---|---|---|
| 5,410,362 | A | * | 4/1995 | Terada et al. ................. 348/614 |
| 5,717,619 | A | * | 2/1998 | Spurbeck et al. ............. 708/319 |
| 6,462,682 | B2 | * | 10/2002 | Hellberg ....................... 341/61 |

* cited by examiner

*Primary Examiner*—Chuong D Ngo
(74) *Attorney, Agent, or Firm*—Blakely, Sokoloff, Taylor & Zafman LLP

(57) ABSTRACT

Apparatus and methods are provided to implement an efficient partial output finite impulse response (FIR) filter. In one embodiment, the filter operates by first receiving a set of samples from a streaming data source via a communications medium. Next the set of samples are organized into a convolution matrix which is decomposed by generating a plurality of diagonal matrixes, each diagonal matrix corresponding with a pre-addition and a post-addition matrix. The filtered samples are generated, in one embodiment, using the plurality of diagonal matrixes, and the filtered samples are output to a communications medium.

21 Claims, 4 Drawing Sheets

PARTIAL OUTPUT FINITE IMPULSE RESPONSE FILTER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention relate generally to the field of data communications. More particularly, embodiments of the present invention relate to a partial output finite impulse response filter.

2. Description of the Related Art

Finite impulse response (FIR) filters are well known digital filters commonly used in data communications. A FIR filter can be configured or adapted to function for example as a low-pass filter, a band-pass filter, or a high-pass filter. These filters can be used to filter digital data samples in a number of ways.

Implementing a FIR filter can be computationally intensive. The numerous add and multiply operations needed to implement the FIR filter can thus slow the speed of a processor, such as a DSP, and can impact the data reception capabilities of a receiver.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Example Communications Device

Figure 1:
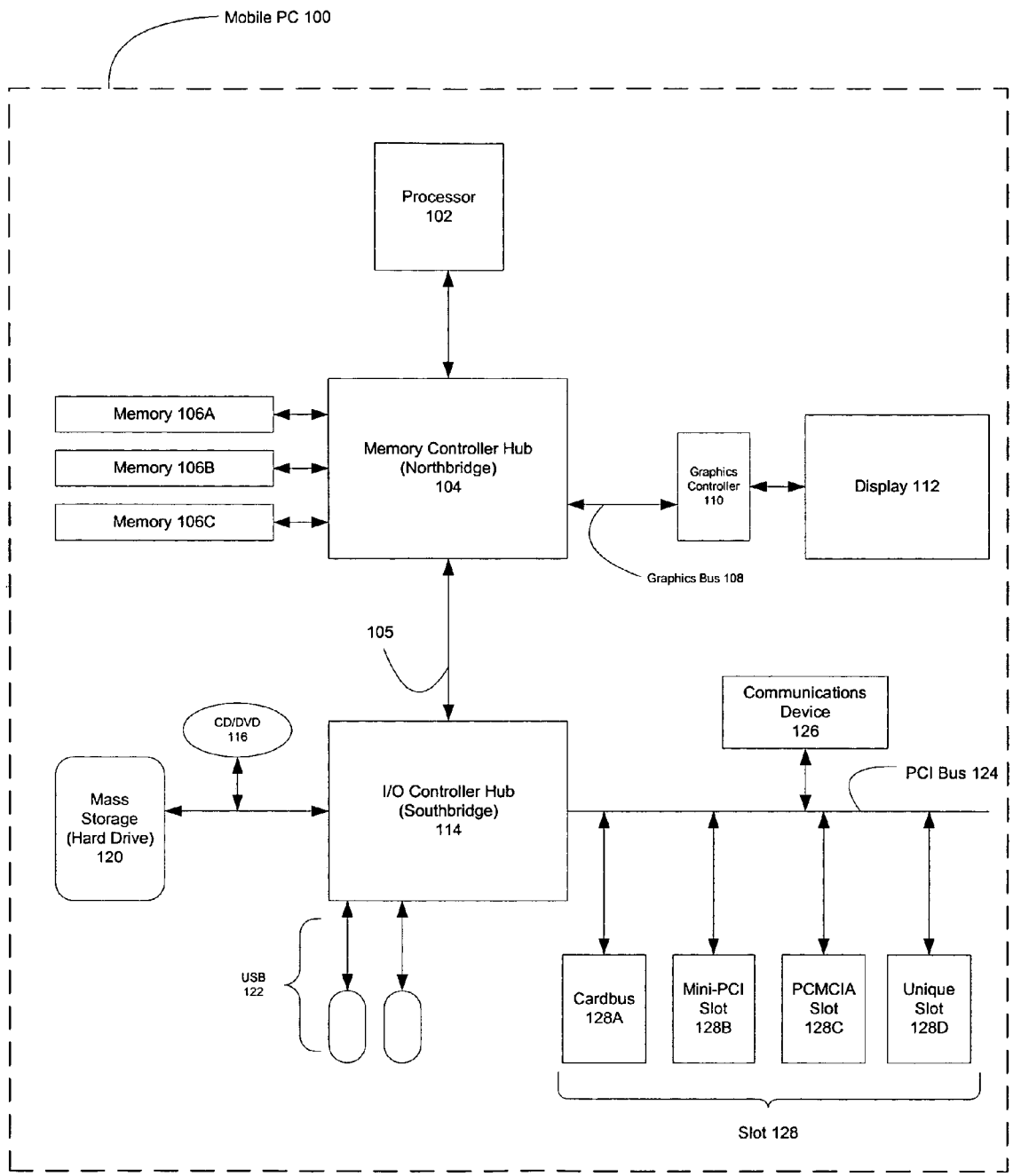
FIG. 1 is a block diagram illustrating an exemplary communications device architecture in which various embodiments of the present invention may be employed.

FIG. 1 illustrates an example communications device—in this case a mobile personal computer—in which various embodiments of the present invention may be implemented. However, this system is described herein merely as an example. Other communications devices in which embodiments of the present invention may be implemented include, but are not limited to, a video receiver, a satellite receiver, any computer system, any mobile or stationary telephone, a set top box, or any device capable of data communication The mobile PC 100 can have a memory controller hub 104 connecting the memory 106(A-C), the display 112, and the processor 102. In some mobile PCs architectures, the memory controller hub 104 is sometimes referred to as the Northbridge because it provides a bridge between the host processor 102 and the rest of the computer system. The processor can be a high-performance notebook central processing unit (CPU) commonly used in mobile PCs. The memory system 106(A-C) can include any storage medium used by mobile PCs. For example, memory 106A can be a static random access memory (SRAM), memory 106B can be a dynamic random access memory (DRAM), and memory 106C can be a read only memory (ROM). The display 112 can be a liquid crystal display (LCD) display or other suitable display technology. The display 112 can be connected to the memory controller hub 104 by a high-speed graphics bus 108 and graphics controller 110, such as an Accelerated Graphics Port (AGP) bus.

In one embodiment, the input/output (I/O) controller hub 114, also known in some architectures as the Southbridge, is connected to the memory controller hub 104 by a point-to-point connection 105. In other architectures, a shared bus may link them. The I/O controller hub 114 controls the operation of the mass storage 120, such as a hard drive, the CD/DVD drive 116, the Universal Serial Buses (USBs) 122, and the Peripheral Component Interconnect (PCI) bus 124. The PCI bus 124 can be used to connect a communications device 126, such as a modem or wireless receiver, to the mobile PC 100. Furthermore, the PCI bus 124 can provide various slots 128 that allow add-in modules to be connected to the mobile PC 100. For example, a slot 128 can include a Cardbus 128A, a Mini-PCI Slot 128B, a Personal Computer Memory Card International Association (PCMCIA) Slot 128C designed to receive PC-Cards, or any unique or proprietary slot 128D either now in existence or developed in the future.

Various embodiments of the FIR filter of the present invention may be implemented inside communications device 126. In one embodiment, communications device 126 includes a digital signal processor (DSP) on board that can control one embodiment of a FIR filter according to an embodiment of the present invention. In another embodiment, the FIR filter may be located on a PC-card used to provide data communication capability.

Conventional Partial Output FIR Filter

Figure 2:
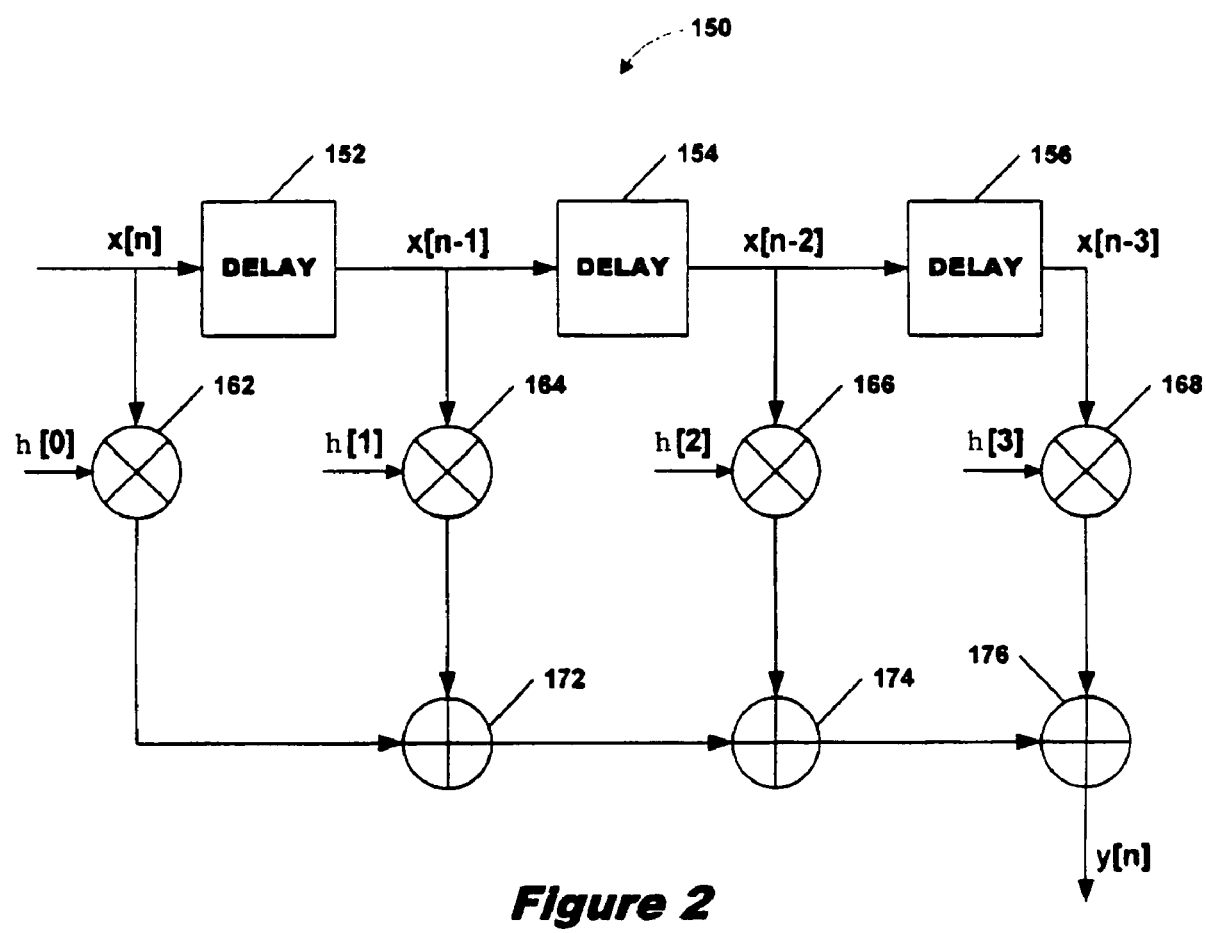
FIG. 2 is a block diagram illustrating a conventional finite impulse response filter.

A block diagram of a conventional FIR filter 150 is set forth FIG. 2. Filter 150, includes unit delays (152, 154, 156), multipliers (162, 164, 166, 168), and adders (172, 174, 176). Input samples x[n] supplied to filter 150 are advanced through unit delays 152, 154 and 156. Typically, each unit delay imposes a delay of one clock cycle. Hence, on a clock cycle where the input sample is x[n], delay 152 outputs the previous input sample x[n−1]; delay 154 outputs the second previous input sample x[n−2]; and delay 156 outputs the third previous input sample x[n−3]. In a hardware or DSP implementation of a unit delay, an input sample value is stored in memory for one clock cycle and then released to the output. In filter 150, for example, delays 152, 154 and 156 may be implemented as three memory cells configured as a shift register.

The input sample x[n] and delayed samples x[n−1] . . . x[n−3] are input to multipliers 162-168 and multiplied by filter coefficients h[0] . . . h[3]. A FIR filter is said to comprise a "tap" for each input sample, i.e., x[n] . . . x[n−3], and each filter coefficient is referred to as a "tap coefficient". Even if some the tap coefficients are "0", the filter is still said to comprise the same number of taps as there are input signals. Hence, filter 150 is a 4-tap filter even if some of coefficients h[0] . . . h[3] are "0". The values of filter coefficients h[0]-h[3] determine the response and characteristics of filter 150, that is, the coefficient values determine the filter gain and frequency response. In a video encoder implementation, the coefficient values will determine the scaling and filtering performed on input data samples. From a mathematical standpoint, computation of the filter coefficients is often the most difficult and complex part of filter design. Several approaches for coefficient generation are familiar to those of ordinary skill in the art. Examples include the Fourier Series method, the Frequency Sampling method and the Remez Exchange Method.

The multiplied or weighted outputs of multipliers 162 ... 168 are summed by adders 172 ... 176. The output y[n] of filter 150, then, can be expressed in Equation 1 as:

$$y[n]=h[0]x[n]+h[1]x[n-1]+h[2]x[n-2]+h[3]x[n-3]. \quad \text{(Eq. 1)}$$

More generally, the output of an N-tap partial output FIR filter can be expressed mathematically in Equation 2 as:

$$y[n] = \sum_{l=0}^{N-1} h_l \cdot x[n-l], n = k, k+1, \ldots, k+N+1 \quad \text{Eq. 2}$$

Equation 2 can be expressed in matrix form. For example, a 4-tap FIR filter expressed in matrix form is shown in Equation 3 as:

$$\begin{bmatrix} y[k] \\ y[k+1] \\ y[k+2] \\ y[k+3] \end{bmatrix} = \begin{bmatrix} x[k] & x[k-1] & x[k-2] & x[k-3] \\ x[k+1] & x[k] & x[k-1] & x[k-2] \\ x[k+2] & x[k+1] & x[k] & x[k-1] \\ x[k+3] & x[k+2] & x[k+1] & x[k] \end{bmatrix} \times \begin{bmatrix} h[0] \\ h[1] \\ h[2] \\ h[3] \end{bmatrix} \quad \text{Eq. 3}$$

It is apparent to one skilled in the art, that the above conventional partial output FIR filter requires 16 multiplies and 12 additions to produce 4 filtered output samples. Multiplies consume more processor resources than do simpler and faster add operations.

The Efficient FIR Filter

For simplicity and ease of understanding, various embodiments of the present invention will be described in matrix form. The relation between a matrix such as Equation 3 and a block diagram such as FIG. 2 is well understood by those skilled in the art. Furthermore, various calculations below use a mathematical tool known as a tensor product. A tensor product, also known as Kronecker product, is a mathematical tool used to decompose or construct a large matrix by using smaller matrix multiplications. For example, if $A_{n1,n2}$ and $B_{m1,m2}$ are matrices of size n1×n2 and m1×m2 respectively, then, the tensor product of A and B, represented by the symbol $\otimes$, results in the matrix C of size m1×n1, m2×n2 as presented in Equation 4:

$$C = A \otimes B = \begin{bmatrix} a_{0,0}B & a_{0,1}B & \ldots & a_{0,n2-1}B \\ a_{1,0}B & a_{1,1}B & \ldots & a_{1,n2-1}B \\ \vdots & \vdots & \ldots & \vdots \\ A_{n1,0}B & a_{n1,1}B & \ldots & a_{n1-1,n2-1}B \end{bmatrix} \quad \text{Eq. 4}$$

That is, the tensor product is constructed by replacing any element of the original matrix A, say $a_{i,j}$ with the product of $a_{i,j}$ with the matrix B.

In equation 3 above, Y is known as the output vector containing four filtered samples, X is known as the convolution matrix, and H is called the coefficient vector. The X matrix is sometimes referred to as the convolution matrix, and it is generated by populating the matrix with samples x[k−3] to x[k+3] as shown in Equation 3. Throughout the rest of this dislosure, C is used interchangeably with X to represent the convolution matrix in order to avoid confusion with the vector x, referring to the vectors of input samples.

Most difficulty arising in FIR processing concerns how to calculate the H vector, i.e., the coefficient vector. However, the embodiments of the present invention are not concerned with the how the coefficient vector is determined, and the coefficient vector will be treated as a given in the description below.

In one embodiment, the convolution matrix is decomposed in a manner that reduces the number of multiplies needed when multiplying by the coefficient matrix. In one embodiment, this also increases the number of additions necessary. However, as noted above, additions are faster than multiplies.

In one embodiment, this is done by decomposing the convolution matrix C into a summation of products of a pre-addition matrix A, a diagonal matrix D, and a post-addition matrix B. Thus, equation 3 can be re-written as Y=ΣA(D(BH)). The pre-addition matrix A, diagonal matrix D, and post-addition matrix B have desirable properties, such that when multiplying them with each other, minimal multiplies are needed. For example, all elements of matrixes A and B are 1, 0, or −1, which do not need to be performed as multiplies at all.

In one embodiment, the convolution matrix C is decomposed into the summation of the product of the three matrixes as shown in Equation 5:

$$C_N^k = \sum_{j=-N/2+1}^{N/2-1} \tilde{B}_j \tilde{D}_j^{k-2j} \tilde{A}_j \text{ where,} \quad \text{Eq. 5}$$

$$\tilde{B}_j = S_{N/2,j} \otimes B \quad \text{Eq. 6}$$
$$\tilde{D}_j^{k-2j} = S_{N/2,j} \otimes D^{k-2j}$$
$$\tilde{A}_j = S_{N/2,j} \otimes A$$

and $$A = \begin{bmatrix} 0 & 1 \\ 1 & -1 \\ 1 & 0 \end{bmatrix}, B = \begin{bmatrix} 1 & 1 & 0 \\ 0 & -1 & 1 \end{bmatrix}, D = \text{diag}\left(\begin{bmatrix} 1 & 1 & 0 \\ 0 & 1 & 0 \\ 0 & 1 & 1 \end{bmatrix} \cdot \bar{x}_k\right) \quad \text{Eq. 7}$$

$$\bar{x}_k = \begin{bmatrix} x[k-1] \\ x[k] \\ x[k+1] \end{bmatrix} \quad \text{Eq. 8}$$

Where N is the length vector H (i.e., the number of taps), k is the input samples discrete time shift and the square shift matrixes S (size nXn that shift by s) are defined as:

$$\text{for } i = 0, 1, \ldots n-1; \quad j = 0, 1, \ldots, n-1 \quad \text{Eq. 9}$$
$$s_{n,s}(i,j) = \begin{cases} 1, & \text{if } (i+s) == j \\ 0, & \text{otherwise} \end{cases}$$

As can be seen, the matrixes A and B and the resulting A' and B' matrixes only have 1s, 0s and −1s as elements. Thus, no product need be performed when multiplying by these elements, only a sign change is possible. Furthermore, the diagonal matrix D is—as its name suggests—a diagonal matrix. This further simplifies matrix operations as multiplication by an n×n matrix requires only n multiplications are as opposed to $n^2$.

Figure 3:
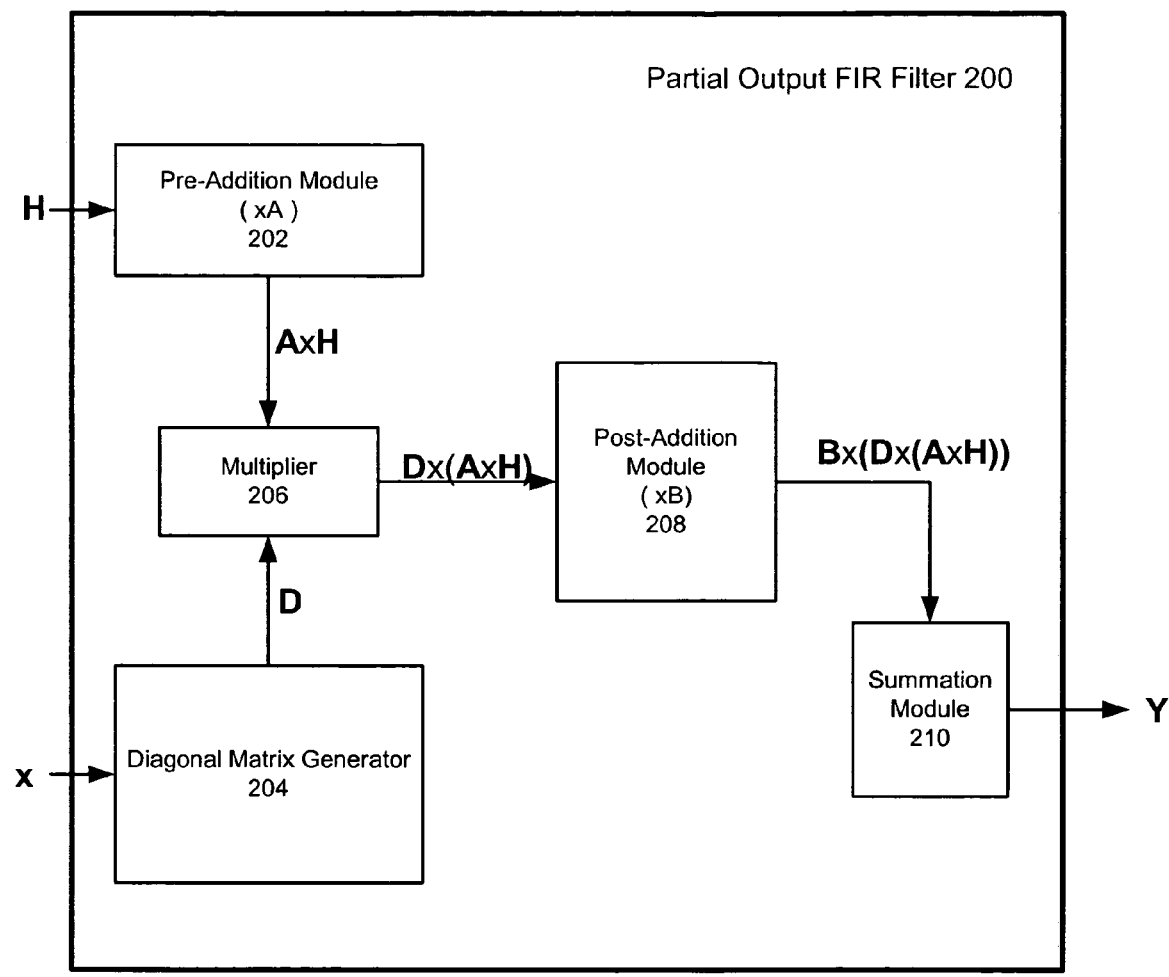
FIG. 3 is a block diagram illustrating a finite impulse response filter according to one embodiment of the present invention.

One embodiment of a partial output FIR filter implementing the matrix decomposition technique is now described with reference to FIG. 3. FIG. 3 is a simplified block diagram of a partial output FIR filter 200 (hereinafter referred to sometimes simply as filter 200).

One input of the filter 200 is the coefficient vector H. As discussed above, the coefficient vector is treated as a given in this disclosure. The filter 200 includes a pre-addition module 202 configured to multiply the input coefficient vector with the appropriate pre-addition matrix. Thus, in one embodiment, the pre-addition module generates and stores the $\tilde{A}_j$ matrixes of Equation 6, selects the appropriate one based on the place in processing, and multiplies it by the coefficient matrix. For simplicity, the output of the pre-addition module is generally represented as AH in FIG. 3.

The $\tilde{A}_j$ matrixes can be determined whenever the number of taps is known. Thus, the pre-addition module 202 pre-calculates and stores the $\tilde{A}_j$ matrixes in one embodiment of the present invention. For the 4-tap example, the $\tilde{A}_j$ matrixes in the pre-addition module would be:

$$\tilde{A}_{-1} = \begin{bmatrix} 0 & 1 \\ 1 & -1 \\ 1 & 0 \end{bmatrix}; \quad \tilde{A}_0 = \begin{bmatrix} 0 & 1 & & \\ 1 & -1 & & \\ 1 & 0 & & \\ & & 0 & 1 \\ & & 1 & -1 \\ & & 1 & 0 \end{bmatrix}; \quad \text{Eq. 10}$$

$$\tilde{A}_1 = \begin{bmatrix} 0 & 1 \\ 1 & -1 \\ 1 & 0 \end{bmatrix};$$

If the filter 200 is a static filter, that is, if the coefficient vector is fixed, that the multiplication of the coefficient vector with the $\tilde{A}_j$ matrixes can also be pre-calculated and stored. If filter 200 is an adaptive filter, then the coefficient vector can change dynamically, and the products of the coefficient vector and the $\tilde{A}_j$ matrixes is calculated during filter 200 operation.

Another input of the filter 200 is a set of samples, represented as an input samples x (not to be confused with the convolution matrix X, which is referred to as C in most equations above) in FIG. 3, containing a set of signal samples that the filter 200 will operate upon. In one embodiment, the samples were received from some data stream source via a communications medium. The streaming data source can be a streaming video or audio device, a phone, a satellite, or other such streaming data sources. The communications medium can be any type of wire, such as coax or twisted pair, or some wireless interface, such as a radio communications channel.

The diagonal matrix generator 204 generates the set of diagonal matrixes from the sample vector x. In one embodiment, the diagonal matrixes are generated as described in equation 6 above. For example, in a 4-tap example, the three diagonal matrixes are generated as:

$$\tilde{D}_{-1}^{k+2} = S_{2,-1} \otimes \text{diag}\left(\begin{bmatrix} x[k+1] + x[k+2] \\ x[k+2] \\ x[k+2] + x[k+3] \end{bmatrix}\right); \quad \text{Eq. 11}$$

$$\tilde{D}_0^k = S_{2,0} \otimes \text{diag}\left(\begin{bmatrix} x[k-1] + x[k] \\ x[k] \\ x[k] + x[k+1] \end{bmatrix}\right);$$

-continued $$\tilde{D}_1^{k-2} = S_{2,1} \otimes \text{diag}\left(\begin{bmatrix} x[k-3] + x[k-2] \\ x[k-2] \\ x[k-2] + x[k-1] \end{bmatrix}\right);$$

The multiplier 206 multiplies together the diagonal matrixes D and the output of the pre-addition module A×H such that each diagonal matrix D is paired with its corresponding pre-addition matrix A. The output of the multiplier 206 is then provided to the post-addition module 208, where the post addition matrixes B are stored and multiplied to the output of the multiplier 206. Again, the post-addition module 208 pairs the diagonal matrix for each output of the multiplier 206 with its corresponding post-addition matrix.

In one embodiment, since the pre- and post-addition matrixes do not depend on the input samples, theses matrixes are pre-calculated and stored at initial filter design. After the number of taps is known (unless the number of taps is dynamic), the pre- and post-addition matrixes can be pre-calculated.

Finally, the summation module 210 generates the filtered sample vector containing filtered samples. In one embodiment, the summation module 210 simply adds up the appropriate number of outputs from the post-addition module 208 to generate the filtered sample vector. For example, for a four-tap filter, the sum of three outputs generates the filtered sample vector.

The set of filtered samples in the filtered sample vector represent the partial output of the FIR filter 200. In one embodiment, the number of filtered samples in the output set is equal to the number of taps.

Figure 4:
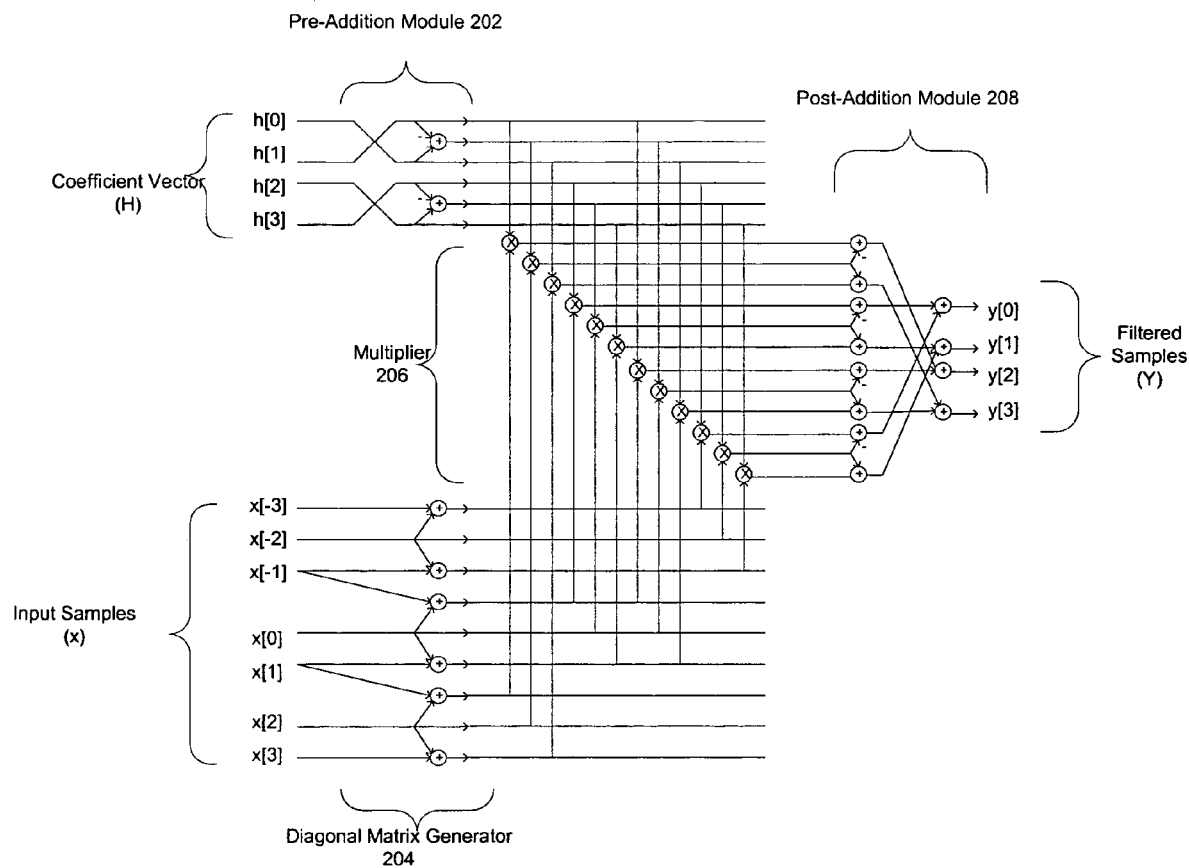
FIG. 4 is a block diagram illustrating a four-tap finite impulse response filter according to one embodiment of the present invention.

FIG. 4 illustrates one embodiment of an implementation of a four-tap FIR filter designed according to the principles discussed in reference to FIG. 3. The filter in FIG. 4 is shown implemented in hardware, but the operations shown therein could be carried out in software as well. FIG. 4 shows how the coefficient vector is multiplied by the pre-addition matrixes using parallel addition modules. As noted above, one advantage of the pre-addition matrixes is that they can be multiplied using only addition operations.

Similarly, the input samples are converted into the three diagonal matrixes using only additions as well. The multiplier module 206 is implemented using actual multipliers, but, the post-addition module 208 is once again implemented using only adders.

The partial output FIR filter shown in FIG. 4 is a four-tap filter. However, the abstract blocks of FIG. 3 can be implemented in a similar manner for any number of taps. The processing can be implemented in hardware using adders and multipliers, as shown in FIG. 4, or in software, as a process carried out by a processor.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes.

Alternatively, the processes may be performed by a combination of hardware and software.

Embodiments of the present invention refer to the add-in module receiving signals from a Wi-Fi wireless network. However, the add-in module could be communicating with any wireless network, including radio, cellular, GPRS, Bluetooth, wireless LAN, infrared, or any other wireless technology.

Embodiments of the present invention refer to a mobile PC. The term mobile PC is not limited to any manufacturer or chipmaker, and includes laptop and various other mobile computers, such as notebook computers, Apple laptop computers, and other such computing devices.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for implementing a partial output finite impulse response (FIR) filter in a communications device, the method comprising:
   receiving a set of samples from a streaming data source via a communications medium;
   decomposing a convolution matrix of the received set of samples into a summation of products of a plurality of matrixes, wherein the summation of products reduces a number of multiplication operations when multiplied with a coefficient matrix of the FIR filter;
   generating a set of filtered samples using the summation of products and the coefficient matrix of the FIR filter; and
   outputting the set of filtered samples to a communications medium.

2. The method of claim 1, wherein the plurality of matrixes comprises a plurality of pre-addition matrixes, and wherein generating the set of filtered samples comprises generating a plurality of first intermediate matrixes by multiplying each of the plurality of pre-addition matrixes with the coefficient matrix, the coefficient matrix defining the operation of the FIR filter.

3. The method of claim 2, wherein the coefficient matrix comprises a matrix of a set of filter coefficients of the FIR filter.

4. The method of claim 2, wherein the plurality of matrixes further comprises a plurality of diagonal matrixes, and wherein generating the set of filtered samples further comprises generating a plurality of second intermediate matrixes by multiplying each of the plurality of first intermediate matrixes with a corresponding diagonal matrix from the plurality of diagonal matrixes.

5. The method of claim 4, wherein the plurality of matrixes further comprises a plurality of post-addition matrixes, and wherein generating the set of filtered samples further comprises generating a plurality of third intermediate matrixes by multiplying each of the plurality of second intermediate matrixes with a corresponding post-addition matrix from the plurality of post-addition matrixes.

6. The method of claim 1, wherein generating the set of filtered samples further comprises summing the plurality of third intermediate matrixes.

7. A partial output finite impulse response (FIR) filter in a communications device comprising:
   an input line to receive a set of samples from a streaming data source via a communications medium;
   a diagonal matrix generator to generate a set of diagonal matrixes based on the received set of samples;
   a pre-addition module to generate a first set of intermediate matrixes by multiplying a coefficient vector with a set of pre-addition matrixes;
   a multiplier coupled to the diagonal matrix generator and the pre-addition module to generate a second set of intermediate matrixes by multiplying each diagonal matrix from the set of diagonal matrixes with a corresponding matrix from the first set of intermediate matrixes;
   a post-addition module coupled to the multiplier to generate a third set of intermediate matrixes by multiplying each matrix from the second set of intermediate matrixes with a corresponding post-addition matrix;
   a summation module coupled to the post-addition module to generate a set of filtered samples by summing the matrixes in the third set of intermediate matrixes; and
   an output line to output the set of filtered samples to the communications medium.

8. The partial output FIR filter of claim 7, wherein the coefficient vector comprises a vector of a set of filter coefficients of the FIR filter.

9. The partial output FIR filter of claim 7, further comprising a memory to store the first set of intermediate matrixes and the set of post addition matrixes.

10. The partial output FIR filter of claim 7, further comprising a memory to store the set of pre-addition matrixes and the set of post addition matrixes, wherein the partial output FIR filter is a dynamic filter.

11. The partial output partial output FIR filter of claim 7, wherein the pre-addition module, the diagonal matrix generator, and the post addition module are implemented using only adders.

12. A machine-readable medium having stored thereon data representing instructions that, when executed by a processor of a communications device coupled to a first communications medium, causes the processor to perform operations comprising:
   receiving a set of samples from a streaming data source via the first communications medium;
   decomposing a convolution matrix of the received set of samples into a summation of products of a plurality of matrixes, wherein the summation of products reduces a number of multiplication operations when multiplied with a coefficient matrix of the FIR filter;
   generating a set of filtered samples using the summation of products and the coefficient matrix of the FIR filter; and
   outputting the set of filtered samples to a second communications medium, the set of filtered samples representing a partial output of a finite impulse response (FIR) filter.

13. The machine-readable medium of claim 12, wherein the plurality of matrixes comprises a plurality of pre-addition matrixes, and wherein generating the set of filtered samples comprises generating a plurality of first intermediate matrixes by multiplying each of the plurality of pre-addition matrixes with the coefficient matrix, the coefficient matrix defining the operation of the FIR filter.

14. The machine-readable medium of claim 13, wherein the coefficient matrix comprises a matrix of a set of filter coefficients of the FIR filter.

15. The machine-readable medium of claim 13, wherein the plurality of matrixes comprises a plurality of diagonal matrixes, and wherein generating the set of filtered samples further comprises generating a plurality of second intermediate matrixes by multiplying each of the plurality of first intermediate matrixes with a corresponding diagonal matrix from the plurality of diagonal matrixes.

16. The machine-readable medium of claim 15, wherein the plurality of matrixes comprises a plurality of post-addition matrixes, and wherein generating the set of filtered samples further comprises generating a plurality of third intermediate matrixes by multiplying each of the plurality of second intermediate matrixes with a corresponding post-addition matrix from the plurality of post-addition matrixes.

17. The machine-readable medium of claim 16, wherein generating the set of filtered samples further comprises summing the plurality of third intermediate matrixes.

18. An apparatus comprising:
a communications device to provide communications capability for the apparatus, the communications device comprising a partial output finite impulse response (FIR) filter having
an input line to receive a set of samples from a streaming data source via a communications medium;
a diagonal matrix generator to generate a set of diagonal matrixes based on the received set of samples;
a pre-addition module to generate a first set of intermediate matrixes by multiplying a coefficient vector with a set of pre-addition matrixes;
a multiplier coupled to the diagonal matrix generator and the pre-addition module to generate a second set of intermediate matrixes by multiplying each diagonal matrix from the set of diagonal matrixes with a corresponding matrix from the first set of intermediate matrixes;
a post-addition module coupled to the multiplier to generate a third set of intermediate matrixes by multiplying each matrix from the second set of intermediate matrixes with a corresponding post-addition matrix;
a summation module coupled to the post-addition module to generate a set of filtered samples by summing the matrixes in the third set of intermediate matrixes; and
a speaker to output data generated using the set of filtered samples.

19. The apparatus of claim 18, wherein the coefficient vector comprises a vector of a set of filter coefficients of the FIR filter.

20. The apparatus of claim 18, further comprising a memory to store the first set of intermediate matrixes and the set of post addition matrixes.

21. The apparatus of claim 18, further comprising a memory to store the set of pre-addition matrixes and the set of post addition matrixes, wherein the partial output FIR filter is a dynamic filter.

* * * * *